(12) United States Patent
Hong et al.

(10) Patent No.: US 9,496,566 B2
(45) Date of Patent: Nov. 15, 2016

(54) STACK FOR SIMULATING CELL VOLTAGE REVERSAL BEHAVIOR IN FUEL CELL

(71) Applicant: Hyundai Motor Company, Seoul (KR)

(72) Inventors: Bo Ki Hong, Seoul (KR); Kook Il Han, Seoul (KR); Ji Yeon Park, Gyeonggi-do (KR); Se Joon Im, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 86 days.

(21) Appl. No.: 13/688,646

(22) Filed: Nov. 29, 2012

(65) Prior Publication Data
US 2014/0065507 A1   Mar. 6, 2014

(30) Foreign Application Priority Data

Aug. 29, 2012 (KR) .................. 10-2012-0094727

(51) Int. Cl.
*H01M 8/04* (2016.01)
*H01M 8/10* (2016.01)

(52) U.S. Cl.
CPC ..... *H01M 8/04089* (2013.01); *H01M 8/04238* (2013.01); *H01M 8/04305* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

2005/0255366 A1*  11/2005  Tighe ............................ 429/38
2006/0046115 A1    3/2006  Bitoh

FOREIGN PATENT DOCUMENTS

| CN | 1744366 A | 3/2006 |
|----|-----------|--------|
| JP | 05-129030 A | 5/1993 |
| JP | 2005-093111 A | 4/2005 |
| JP | 2008-027813 A | 2/2008 |
| JP | 2008-140662 A | 6/2008 |
| KR | 10-2006-0088931 | 8/2006 |
| KR | 10-2009-0053197 | 5/2009 |
| KR | 10-2009-0084297 A | 8/2009 |

* cited by examiner

*Primary Examiner* — Patrick Ryan
*Assistant Examiner* — Haixia Zhang
(74) *Attorney, Agent, or Firm* — Mintz Levin Cohn Ferris Glovsky and Popeo, P.C.; Peter F. Corless (57) ABSTRACT

Disclosed is a stack for simulating a cell voltage reversal behavior in a fuel cell. The stack is configured to have a structure in which a separator of a portion of a plurality of cells in the stack have an inlet of a hydrogen flow field partially blocked to induce hydrogen starvation only in the portion of the plurality of cells.

7 Claims, 11 Drawing Sheets

FIG.1

PRIOR ART

FIG.2

PRIOR ART

STACK FOR SIMULATING CELL VOLTAGE REVERSAL BEHAVIOR IN FUEL CELL

CROSS-REFERENCE TO RELATED APPLICATION

This application claims under 35 U.S.C. §119(a) the benefit of Korean Patent Application No. 10-2012-0094727 filed Aug. 29, 2012, the entire contents of which are incorporated herein by reference.

BACKGROUND (a) Technical Field

The present invention relates to a stack for simulating a cell voltage reversal behavior in a fuel cell. More particularly, the present invention relates to a stack for simulating a cell voltage reversal behavior in a fuel cell, which simulates a voltage reversal behavior locally generated only in a portion of a plurality of cells of a fuel cell stack.

(b) Background Art

Polymer Electrolyte Membrane Fuel Cell (PEMFC) technology has been widely used as a fuel cell for vehicles. In order for the PEMFC to properly effectuate high power performance of at least tens of kW under various operation conditions of vehicles, the PEMFC needs to be stably operated within a wide current density range.

As is well-known, fuel cells are complied as a stack in which unit cells are stacked to meet power requirements therefrom. A Membrane-Electrode Assembly (MEA) is located at the innermost portion of the unit cell of the fuel cell stack. The MEA includes a solid polymer electrolyte membrane that can move hydrogen ions, and an anode and a cathode that are catalyst electrodes configured by coating a catalyst on both surfaces of the polymer electrolyte membrane. Additionally, a Gas Diffusion Layer (GDL) and a gasket are disposed outside MEA, i.e., outside the anode and the cathode. Also, a separator or bipolar plate is disposed outside the GDL to provide a flow field for supplying reactant gases and exhausting water generated from a reaction.

In a reaction for generating electricity in a fuel cell, after hydrogen supplied to the anode at which oxidation occurs in the fuel cell is divided into hydrogen ions and electrons, hydrogen ions move toward the cathode at which reduction occurs through a polymer electrolyte membrane, and electrons move toward the cathode through an external circuit. Also, in the cathode, oxygen molecules, hydrogen ions, and electrons react with each other to generate electricity, heat and water as a by-product.

If the amount of water generated from the electrochemical reaction in the fuel cell is appropriate, the generated water may serve to maintain an appropriate humidity from the MEA operate efficiently. However, if water is excessively generated, and the excessive water is not removed at a high current density, flooding may occur. This flooding may prohibit reactant gases from being efficiently supplied to the fuel cell, thus further deepening a voltage loss.

Due to various causes such as the flooding in the fuel cell, freezing during winter, and the abnormality of a reactant gas supply device, deficiency of reactant gases, i.e., hydrogen of the anode and oxygen or air of the cathode, that are used in the PEMFC may occur. Particularly, it is known that the hydrogen fuel starvation of the anode has a significantly detrimental influence on the performance of the fuel cell since it significantly reduces the cell voltage.

Generally, the hydrogen fuel starvation can be classified into overall hydrogen starvation in which the hydrogen supply is deficient throughout the entire fuel cell and local hydrogen starvation in which the hydrogen supply is locally deficient due to uneven distribution in spite of the sufficient hydrogen supply. Hydrogen fuel starvation frequently occurs under an operation condition such as uneven supply and distribution of hydrogen gas, a sudden increase of a fuel cell load demand, and/or fuel cell start-up. The overall hydrogen starvation can be relatively easily detected by monitoring the hydrogen supply using a sensor at a fuel cell system but the local hydrogen starvation in a portion of cells can be detected only by precisely monitoring each cell of the fuel cell stack individually using a stack voltage monitoring apparatus, requiring much more endeavor and a more complex control system. Here, a stack refers to a fuel cell including two or more cells, and the portion of cells refers to one or more cells that are equal to or less than 50% of the total number of cells in the stack.

Figure 1:
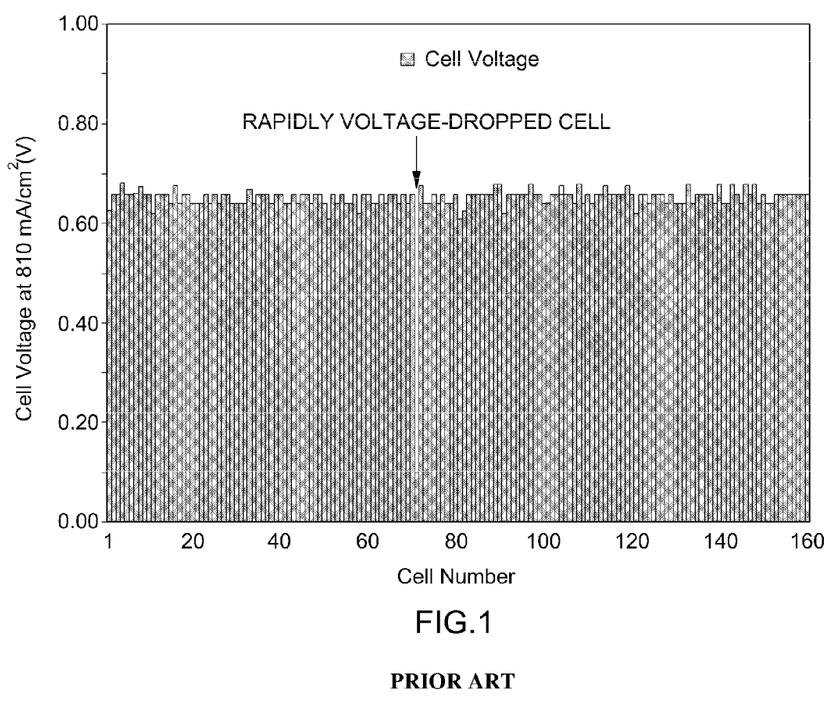
FIG. 1 is a view illustrating a rapid drop of a cell voltage generated in a stack of a conventional fuel cell vehicle.

FIG. 1 is a view illustrating a rapid drop of a cell voltage generated in a stack of an actual fuel cell vehicle. In the fuel cell stack shown in FIG. 1, the voltage of one cell rapidly drops to 0.1 V during operation for five minutes or more. When the rapid drop of the cell voltage occurs, the operation of the stack in a vehicle needs to be shut down so that the entire fuel cell does not become damaged, and then the abnormal operating cell needs to be replaced or repaired. This phenomenon usually occurs due to local hydrogen starvation. When a user continues to drive a vehicle while leaving the voltage dropped cell unrepaired, the vehicle may quickly reach a cell voltage reversal state in which the voltage becomes less than 0 V, accelerating the corrosion of carbon that is a catalyst support of MEA.

Generally, carbon widely used in the MEA catalyst support is thermodynamically unstable under an operation condition of PEMFC, and may be oxidized as the following chemical reaction formula:

$$C+2H_2O \to CO_2+4H^++4e^- (0.207 \text{ V vs. RHE})$$

$$C+H_2O \to CO+2H^++2e^- (0.518 \text{ V vs. RHE})$$

Here, RHE means a reference hydrogen electrode. Generally, the above oxidation reactions slowly proceed, but can quickly proceed under a high voltage condition of a fuel cell. The high voltage condition is frequently caused by the hydrogen starvation or start-up/shut-down of a fuel cell vehicle. Also, when cell voltage reversal continues and then reaches an excessive voltage reversal state of about −2 V, the generated heat of the fuel cell becomes excessive, damaging the MEA and the gas diffusion layer as a whole, and particularly, causing a severe situation where a pin-hole occurs in the MEA and cells are electrically shorted. Thus, the fuel cell reaches a cell failure state in which the fuel cell cannot normally operate anymore and must be completely replaced.

Therefore, it is important to allow a fuel cell vehicle to stably operate by appropriately controlling the fuel cell vehicle before voltage reversal occurs and to develop fuel cell parts and systems with excellent durability which can withstand the voltage reversal. However, since cell voltage reversal due to local hydrogen starvation described above is difficult to detect before a fuel cell vehicle is being operated, a standard diagnosis technique that can reproducibly simulate this phenomenon should be secured before the vehicle begin operation.

As a typical method widely used to simulate the cell voltage reversal, there are methods that supply nitrogen instead of hydrogen to the anode or reduce the total hydrogen supply by reducing the Stoichiometric Ratio (S.R.) of the anode. However, in these methods, it is very difficult to reproducibly simulate the rapid drop of the cell performance and the voltage reversal due to the local hydrogen starvation of some cells out of several hundreds of cells in a stack of an actual fuel cell vehicle.

Accordingly, since there is no appropriate method for simulating the local cell voltage reversal in a fuel cell, it has been difficult to develop fuel cell vehicle control methods or fuel cell parts with excellent durability regarding the voltage reversal.

Figure 2:
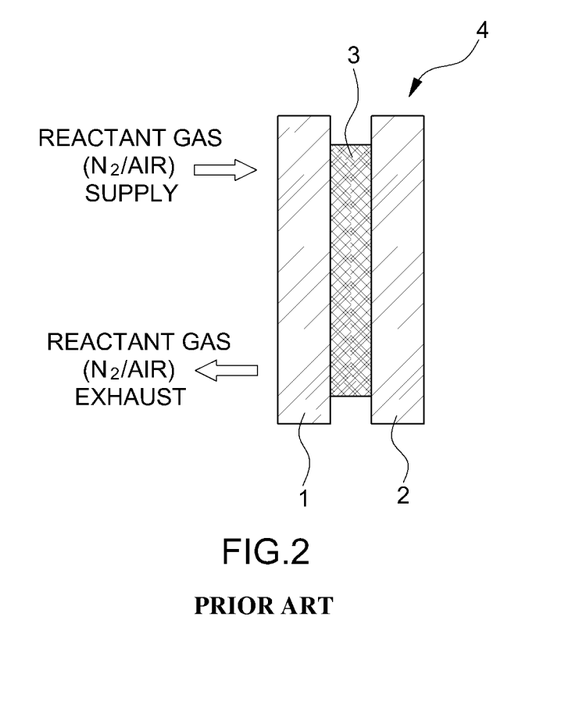
FIG. 2 is a view illustrating a single cell for cell voltage reversal simulation in a conventional fuel cell according to a comparative example.

Furthermore, a typical method of simulating a cell voltage reversal in a fuel cell can use either a single cell or a stack including two or more cells. For example, FIG. 2 illustrates a conventional single cell 4 for a cell voltage reversal simulation in a fuel cell, where a cell 3 is disposed between both end plates 1 and 2. The above voltage reversal simulation method is for simulating a severe condition in which hydrogen deficiency is significant or hydrogen supply has completely stopped. Voltage reversal is induced by operating a fuel cell by supplying nitrogen instead of stopping hydrogen supply to the anode of cells of a fuel cell. This typical simulation method can simulate a voltage reversal generated over an entire fuel cell stack under a very severe condition in which hydrogen supply to the cells has ceased. However, it is very difficult to simulate an occurrence of a local voltage reversal in which the voltage rapidly drops only in some cells among hundreds of cells like a stack of a fuel cell vehicle. Also, the typical simulation method can be reportedly operated only in a low current density range, e.g., from 40 mA/cm$^2$ to 200 mA/cm$^2$ after nitrogen instead of hydrogen is supplied to the anode.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a stack for simulating a cell voltage reversal behavior in a fuel cell, which can precisely simulate a local voltage reversal generated in some cells of a stack in an actual fuel cell vehicle by locally interrupting hydrogen supply by partially blocking a flow field inlet in which hydrogen introduced through a hydrogen inlet flows using a blocking member attached to a separator for some cells among a fuel cell stack.

In one aspect, the present invention provides a stack for simulating a cell voltage reversal behavior in a fuel cell, configured to have a structure in which a separator of a portion of a plurality of cells in the stack includes an inlet of a hydrogen flow field that is partially blocked to induce hydrogen starvation only in the portion of the plurality of cells.

In an exemplary embodiment, the stack may include a blocking member at a front end of the inlet of the hydrogen flow field to block hydrogen supply through a hydrogen supply inlet. This blocking member may block a total area of the inlet of the hydrogen flow field of the separator by about 70% to about 95%. Additionally, the blocking member may be formed of a polymer or a metallic material.

In yet another exemplary embodiment, the stack may operate at a current density of about 200 mA/cm$^2$ to about 1,000 mA/cm$^2$. The number of the cells with the inlet of the hydrogen flow field blocked may range from one to a half of the total number of the cells in the stack.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

10: stack (cell voltage reversal simulation stack)
11: first cell
12: second cell
13: third cell
14: fourth cell
15: fifth cell
20: separator of third cell
21: hydrogen supply inlet of separator of third cell
22: hydrogen exhaust outlet of separator of third cell
23: air supply inlet of separator of third cell
24: air exhaust outlet of separator of third cell
25: hydrogen flow field of separator of third cell
26: blocking member It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The above and other features of the invention are discussed infra.

Hereinafter, exemplary embodiments of the present invention will be described in detail with reference to the accompanying drawings so that those skilled in the art can easily carry out the present invention.

The present invention relates to a stack for simulating a cell voltage reversal of a fuel cell, which can accurately simulates a local cell voltage reversal in which a voltage rapidly drops only a portion of a plurality of cells in the stack of an actual fuel cell vehicle, and is characterized in that the cell voltage reversal behavior is simulated by inducing a local hydrogen starvation only in a certain cell.

Thus, the present invention provides a cell voltage reversal simulation stack, in which hydrogen is normally supplied to the entire anode of a fuel cell stack, but a voltage reversal is allowed to occur only in a certain cell after an operation begins for about five minutes or more at above 0 V by locally blocking a hydrogen supply inlet of a separator for a certain cell by about 70% to about 95%.

In an embodiment of the present invention, hydrogen supply from a separator (20 of FIG. 4) for only one cell 13 within a stack (10 of FIG. 3) including five cells (11 to 15) stacked therein may be partially blocked to achieve a local hydrogen starvation in the stack 10 and simulate a local cell voltage reversal behavior like in an actual fuel cell vehicle. In the stack 10 for simulating the cell voltage reversal behavior according to the exemplary embodiment of the present invention, hydrogen may be normally supplied to the entire anode of the stack through the hydrogen supply inlet of each cell 11 to 15, but the hydrogen supply only for a third cell 13 disposed at the center of the stack 10 may be partially interrupted to induce a local hydrogen starvation only in the third cell 13. Thus, the local cell voltage reversal behavior unexpectedly generated during the normal operation for about five minutes or more at a voltage of 0 V or more after start-up of the fuel cell vehicle can be simulated like in a stack of an actual fuel cell vehicle.

Figure 4:
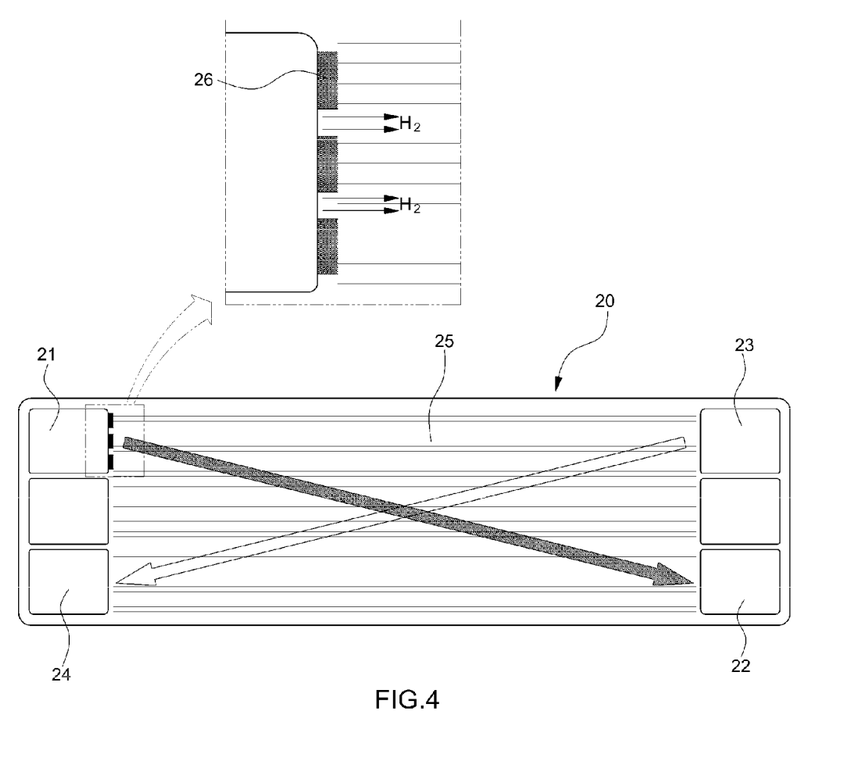
FIG. 4 is a view illustrating an attachment structure of a blocking member of a separator according to an exemplary embodiment of the present invention.

FIG. 4 illustrates a structure for inducing local hydrogen starvation in a stack. Referring to FIG. 4, a separator 20 of a third cell 13 may be provided. The separator 20 may include a flow field that connects a hydrogen supply inlet 21, a hydrogen exhaust outlet 22, an air supply inlet 23, and an air exhaust outlet 24. The flow field may be disposed so as to independently connect the hydrogen supply inlet 21, the hydrogen exhaust outlet 22, the air supply inlet 23, and the air exhaust outlet 24, respectively. In FIG. 4, however, the flow filed is shown as a straight line. In order to clarify the attachment location of a blocking member 26 described below, a hydrogen flow field 25 that connects the hydrogen supply inlet 21 and the hydrogen exhaust outlet 22 is shown in FIG. 4.

As shown in FIG. 4, the hydrogen supply inlet 21 and the hydrogen exhaust outlet 22 may be disposed at both ends of the separator 20 of the third cell 13. The hydrogen flow fields 25 may be disposed between the hydrogen supply inlet 21 and the hydrogen exhaust outlet 22 to allow hydrogen introduced through the hydrogen supply inlet 21 to move through the cells. The blocking member 26 may be disposed between the hydrogen supply inlet 21 and the hydrogen flow fields 25.

The blocking member 26 may be attached to one surface of the separator 20 in which the hydrogen flow fields 25 are disposed. The blocking member 26 may be attached to the front end of the inlet of the hydrogen flow field to induce a hydrogen supply deficiency of the third cell 13 by blocking the hydrogen supply passage. As a result, the blocking member 26 may induce the hydrogen supply deficiency with respect to only the third cell 13 while not affecting the hydrogen supply path to other cells.

While hydrogen flowing into a hydrogen supply manifold (see FIG. 3, hydrogen supply inlets of the cells 11 to 15 stacked are connected to each other) is smoothly supplied to the first cell 11, the second cell 12, the fourth cell 14, and the fifth cell 15 without a supply deficiency, hydrogen supply to the third cell 13 may be blocked by the blocking member 26, thus inducing the hydrogen supply deficiency.

In order to simulate a cell voltage reversal behavior due to local hydrogen starvation in one cell of the stack 10 supplied with hydrogen, the blocking member 26 may have a film or sheet formed of a polymer or a metallic material with excellent stiffness to block the hydrogen supply. When the blocking member 26 is disposed between the hydrogen inlet 21 and the hydrogen flow field 25 of the separator 20, the hydrogen flow field 25 of the separator 20 may be blocked by about 70% to about 95%. In other words, the blocking member 26 may be attached to the inlet of the hydrogen flow field to block the inlet of the hydrogen flow field 25 by about 70% to about 95% of the total area.

When the inlet of the hydrogen flow field is blocked less than about 70%, a voltage reversal due a local hydrogen starvation may not occur under a given operation condition, making it difficult to simulate the cell voltage reversal behavior. On the other hand, when the inlet of the hydrogen flow field is blocked more than about 95%, the voltage reversal may be generated too quickly due to excessive hydrogen starvation, making it difficult to simulate the voltage reversal due to a rapid performance drop of some cells during a normal operation like in an actual fuel cell vehicle.

Also, in order to simulate the voltage reversal even for a high speed operation range like in the actual fuel cell vehicle, a fuel cell stack needs to be operated at a high constant current density compared to a typical current density of about 200 mA/cm$^2$. When the constant current density is equal to or greater than about 1,000 mA/cm$^2$, however, the voltage reversal may occur too quickly due to excessive hydrogen starvation. Accordingly, the constant current density for the operation of the stack may range from about 200 mA/cm$^2$ to about 1,000 mA/cm$^2$.

Figure 3:
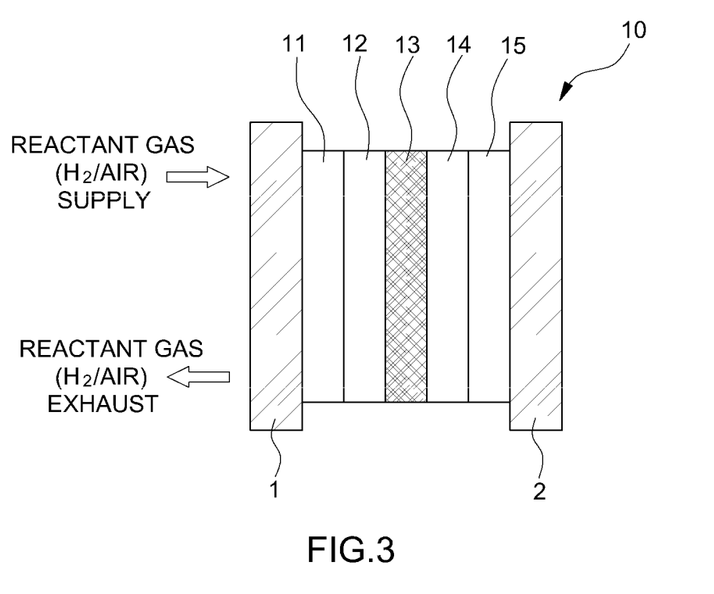
FIG. 3 is a view illustrating a cell voltage reversal simulation stack of a fuel cell according to an exemplary embodiment of the present invention.

In this embodiment, it is described that the blocking member 26 is attached to only the separator 20 of the third cell 13 to induce the hydrogen starvation, but other embodiments are not limited thereto. That is, the cell voltage reversal simulation stack may be implemented such that the hydrogen starvation is induced in 50% or less of the total number of the cells constituting the stack. For example, in case of the stack 10 including five cells 11 to 15 as shown in FIG. 3, the blocking member may be attached to two cells randomly selected from the first to fifth cells 11 to 15 to configure the cell voltage reversal simulation stack.

At the both ends of the separator 20, the air exhaust outlet 24 may be disposed under the hydrogen supply inlet 21, and the air supply inlet 23 may be disposed over the hydrogen exhaust outlet 22.

Hereinafter, a cell voltage reversal behavior will be simulated through the stack according to the exemplary embodiment of the present invention.

As a comparative example, a cell voltage reversal simulation stack (see FIG. 2) including a single cell was manufactured. Nitrogen instead of hydrogen was supplied to the anode, and the operation was performed at a constant current density of about 200 mA/cm$^2$.

As an exemplary embodiment, a stack including five cells was manufactured. A film (blocking member) formed of polyimide was disposed between a hydrogen supply inlet and a hydrogen flow field of a separator of one cell disposed at the center of the stack to interrupt the hydrogen supply by about 83%. Thus, hydrogen was allowed to be supplied to a hydrogen supply manifold (or the whole anode of the stack) at a normal operation Stoichiometric Ratio (S.R.) of about 1.5. On the other hand, hydrogen starvation was allowed to occur only in the cell to which the blocking member is attached. Under normal operating conditions, hydrogen was supplied to the anode of the stack at S.R. of about 1.5, and air was supplied to the cathode of the stack at S.R. of about 2.0.

Hydrogen was normally supplied to the anode (or hydrogen supply inlet) of the whole stack, and the operation was performed by applying a medium current density of about 480 mA/cm$^2$. On the other hand, the inlet of a portion of the hydrogen flow field of one cell disposed at the center of the stack was blocked by the blocking member to induce a local hydrogen starvation only in this cell. Thus, the voltage behavior of each cell was observed.

The exemplary embodiment of the present invention simulates the situation in which the hydrogen supply inlet of the separator may be locally blocked by an excessive amount of water, ice, or other impurities, while the hydrogen S.R. is being maintained under normal operating conditions. In this case, a cell in which local hydrogen starvation occurs may normally operate for several minutes similarly to other normally operating fuel cells, and then a cell voltage reversal may occur. Thus, the local cell voltage reversal that rapidly occurs in a single or some cells under normal operating conditions of an actual fuel cell vehicle can be accurately simulated.

Generally, the normal supply condition of reactant gases at the fuel cell means that the hydrogen S.R of the anode ranges from about 1.3 to about 1.8 and the air S.R. of the cathode ranges from about 1.6 to about 2.5. When the hydrogen and air S.R are less than about 1.3 and 1.6, respectively, the supply of the reactant gases may become too deficient. On the other hand, when the hydrogen and air S.R are greater than about 1.8 and about 2.5, respectively, the supply of the reactant gases may become excessive, increasing unnecessary loss of the reactant gases. Thus, the local cell voltage reversal behavior of a single cell unexpectedly generated during the normal operation for five minutes or more at a voltage of 0 V or more after the start-up of the fuel cell vehicle was simulated.

Here, for the condition for evaluating the cell voltage reversal behavior, the cell temperature was set to about 65° C., and the relative humidities of the anode and the cathode were set to about 50%, respectively.

Figure 5:
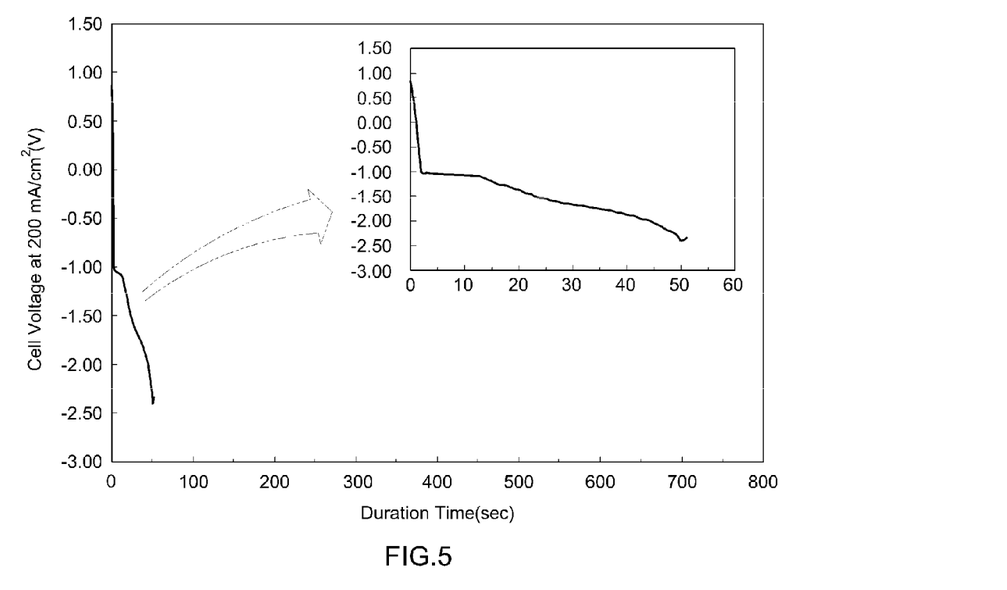
FIG. 5 is a graph illustrating a simulation result of a cell voltage behavior under a severe hydrogen starvation condition where nitrogen gas is supplied instead of supplying hydrogen to the anode of a fuel cell according to a comparative example.

FIG. 5 is a graph illustrating a simulation result of a cell voltage behavior under a severe hydrogen starvation condition where nitrogen gas is supplied instead of supplying hydrogen to the anode of a fuel cell according to a comparative example. As shown in FIG. 5, in the comparative example condition, since the time during which the fuel cell normally operates is very short, the cell voltage rapidly dropped below 0 V after about two seconds even at a low current density of about 200 mA/cm$^2$, generating a voltage reversal. Also, the cell voltage was rapidly reduced to about −2.4 V after about 50 seconds. Accordingly, in a conventional method like the comparative example, it is very difficult to simulate the cell voltage reversal that locally and suddenly occurs in some cells after the normal operation for about five minutes or more like in a stack of an actual fuel cell vehicle.

Figure 6:
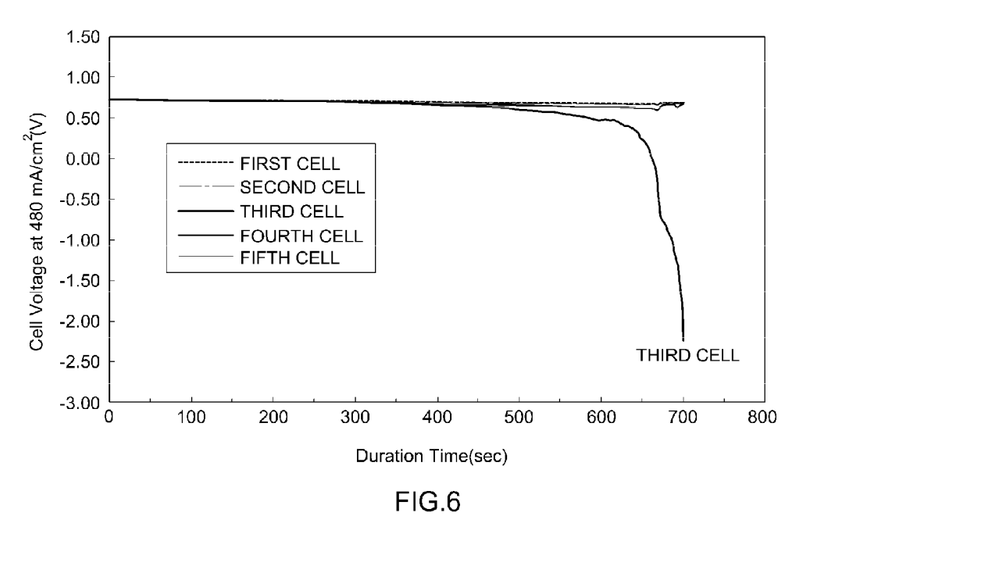
FIG. 6 is a graph illustrating an occurrence of a voltage reversal due to a local hydrogen starvation of a fuel cell stack, simulated according to an exemplary embodiment of the present invention.

FIG. 6 is a graph illustrating an occurrence of a voltage reversal due to local hydrogen starvation of a fuel cell stack, simulated according to an exemplary embodiment of the present invention. As shown in FIG. 6, a middle cell (third cell) in which local hydrogen starvation is intentionally induced among a stack may normally operate for about 400 seconds well above a voltage of 0 V similarly to other cells (first cell, second cell, fourth cell, and fifth cell). Thereafter, the cell voltage may continuously drop to reach a cell voltage reversal state below 0 V after about 664 seconds and then reach about −2.2 V after about 700 seconds, consequently, a cell failure state.

Figure 7:
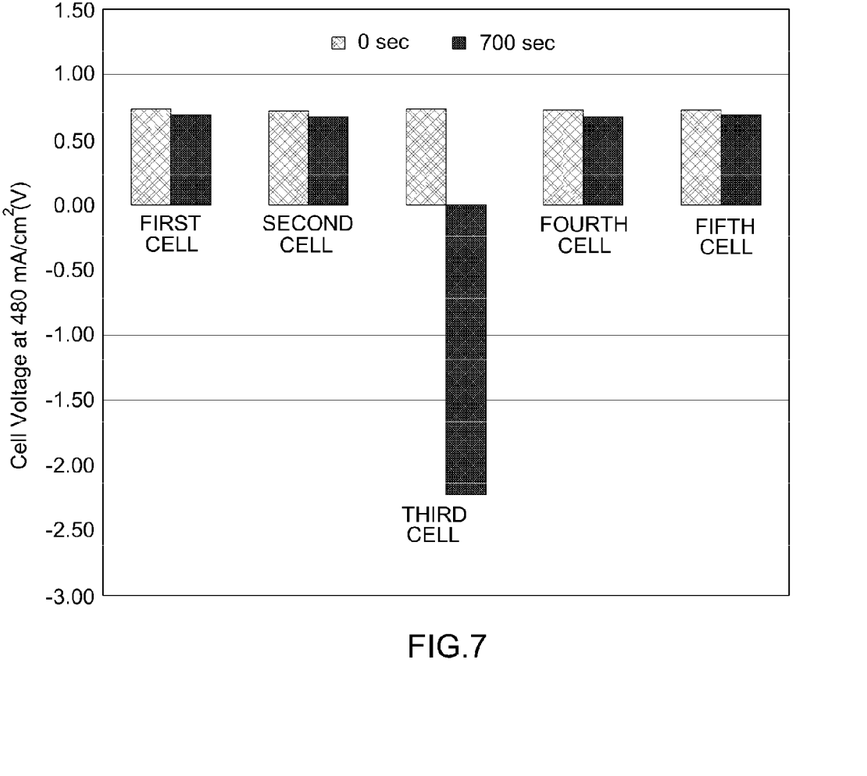
FIG. 7 is a graph illustrating cell voltages at a current density of about 480 mA/cm$^2$ at start point (0 second) and finish point (700 seconds) of local hydrogen starvation simulation of a stack according to an exemplary embodiment of the present invention.

FIG. 7 is a graph illustrating cell voltages at a current density of about 480 mA/cm$^2$ at start point (0 second) and finish point (about 700 seconds) of local hydrogen starvation simulation of a stack according to an embodiment of the present invention. As shown in FIG. 7, under the constant current density condition, the cell voltages of the normal cells such as the first cell, the second cell, the fourth cell, and the fifth cell insignificantly changes, whereas the voltage of the third cell in which local hydrogen supply starvation is intentionally simulated is significantly reduced to show a distinct voltage reversal.

The cell voltage reversal simulation stack according to the exemplary embodiment of the present invention may properly simulate the stack in the actual fuel cell vehicle when hydrogen S.R. 1.5 is supplied as a whole during normal operating conditions, a local hydrogen starvation occurs in a single cell due to unexpected reasons, causing the voltage reversal only in some cells of the stack.

Particularly, the stack according to the comparative example has a limitation in that since the cell voltage is reduced even at a low current density of about 200 mA/cm$^2$, and the time to reach the voltage reversal is too short, only the low speed condition of the actual fuel cell vehicle can be simulated. However, since the stack according to the exemplary embodiment of the present invention reaches the voltage reversal after the normal operation for five minutes or more even at a medium current density of about 480 mA/cm$^2$, additional speed conditions of the fuel cell vehicle can also be simulated.

Figure 8:
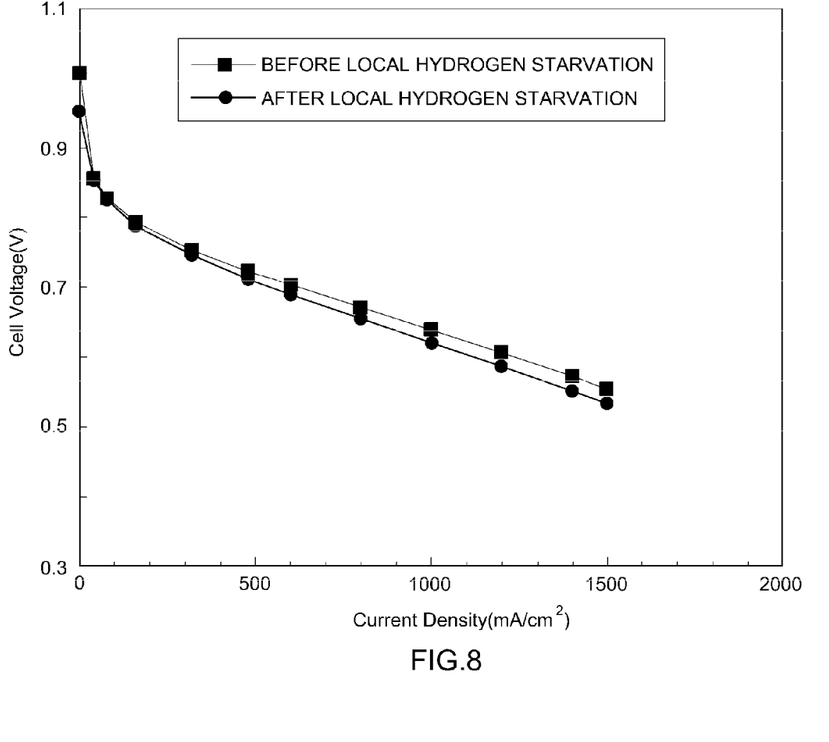
FIG. 8 is a graph illustrating a comparison of I-V cell performances before and after the voltage reversal simulation regarding local hydrogen starvation of a third cell of a stack according to an exemplary embodiment of the present invention.

FIG. 8 is a graph illustrating a comparison of I-V cell performances before and after the voltage reversal simulation regarding local hydrogen starvation of a third cell of a stack according to an embodiment of the present invention. The I-V cell performance was measured using a typical commercialized apparatus (e.g., 1 kW Test Station, Won-A Tech Co., Korea) at the following operation condition: the temperature of a cell inlet of a fuel cell is about 65° C. The gas pressure is near ambient pressure. The relative humidity (R. H.) of anode (hydrogen)/cathode (air) is about 50%/50%. Anode (hydrogen)/cathode (air) S.R. is about 1.5/2.0.

As shown in FIG. 8, the I-V cell performance of the third cell was reduced at all current densities due to the occurrence of the voltage reversal. The Open Circuit Voltage (OCV) was reduced from about 1.007 V before the voltage reversal evaluation to about 0.952 V after the voltage reversal evaluation by about 5.5%, and at a high current density of about 1,500 mA/cm$^2$, the cell voltage was reduced from about 0.555 V before the voltage reversal evaluation to about 0.533 V after the voltage reversal evaluation by about 4.0%.

The reduction of the I-V cell performance may indicate that the MEA and the gas diffusion layer are significantly damaged due to excessive heat generated at the voltage reversal condition and the simulation method according to the embodiment simulates the cell damage by the voltage reversal in the same or similar manner.

In order to morphologically observe the degree of damage to the MEA due to the occurrence of the voltage reversal, the surface of the MEA anode catalyst layer before and after the voltage reversal simulation was observed using a Scanning Electron Microscope (e.g., SEM; Inspect™, FEI Co., USA). The observation result is shown in FIG. 9.

Generally, the length X width of a pin-hole in the MEA, which is generated by excessive heat due to the voltage reversal, may be at least 0.2 mm×0.2 mm. When exposed to a severe voltage reversal condition, the dimension thereof may be greater than several mm by several mm.

Figure 9A:
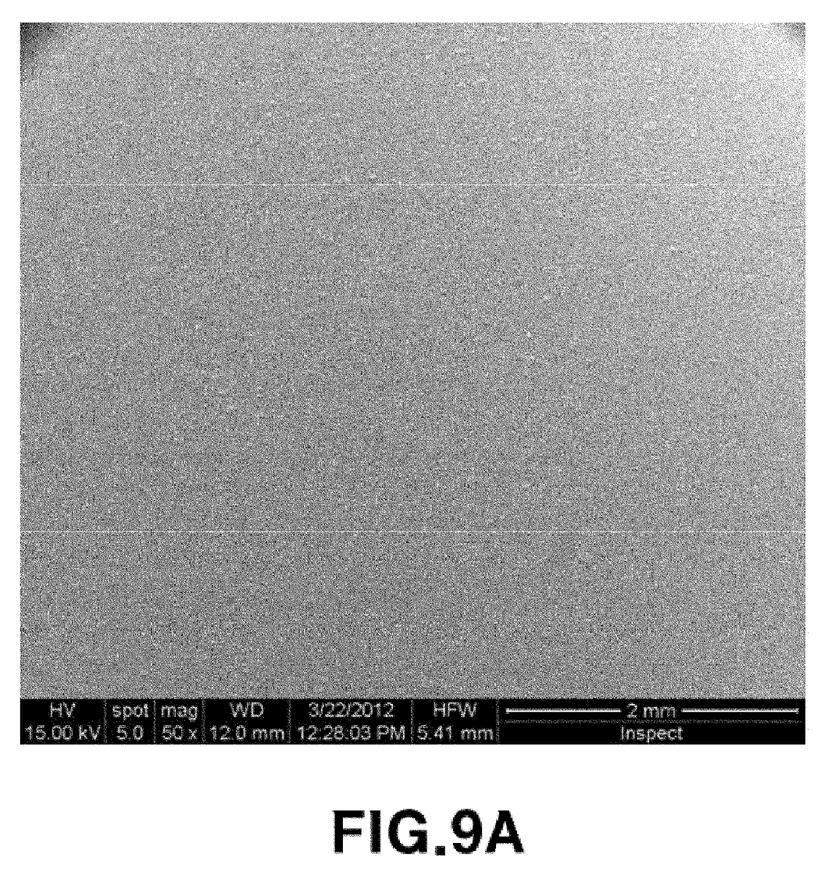
FIG. 9A-C are SEM photographs of the surface of an MEA anode catalyst layer before (FIG. 9A) and after (FIGS. 9B and 9C) the voltage reversal simulation according to an exemplary embodiment of the present invention.
Figure 9B:
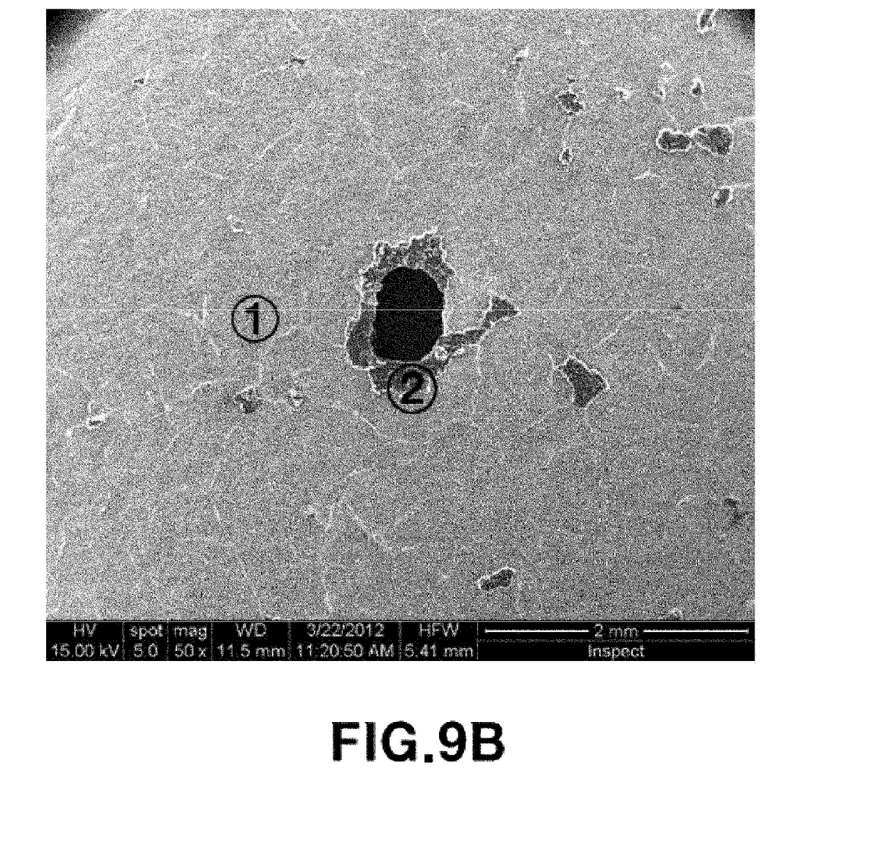
Figure 9C:
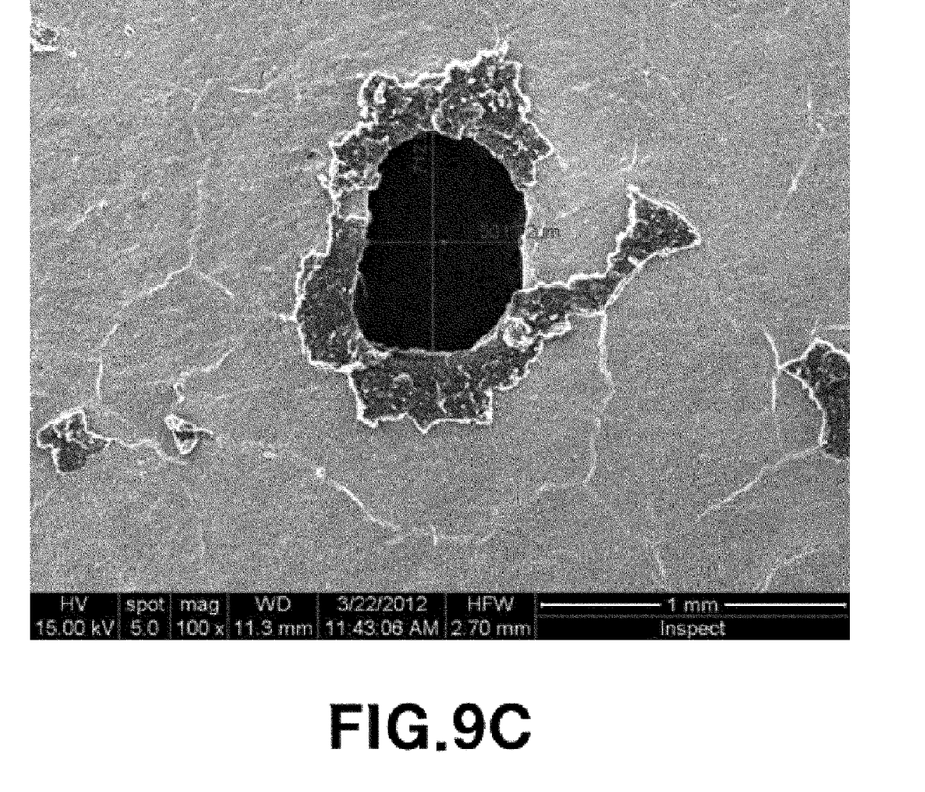

FIG. 9A is a 50×m magnified photograph illustrating the surface of the anode of a fresh MEA before the voltage reversal simulation, and FIGS. 9B and 9C are 50× and 100× magnified photographs illustrating the surface of the MEA anode of the third cell after the voltage reversal simulation, respectively.

As shown in FIGS. 9B and 9C, a pin-hole having a dimension of about 0.7 mm×about 0.5 mm (e.g., length×width) may be formed in the surface of the MEA anode due to the heat generated at the voltage reversal condition, which indicates that the condition of the exemplary embodiment also properly simulates the pin-hole generation phenomenon generated at the voltage reversal. Also, it can be observed that impurities like micro-porous layer detached from the gas diffusion layer may be attached around the pin-hole.

In order to more specifically analyze the impurities, elemental analysis was performed using an Energy Dispersive X-ray spectrometer (e.g., EDX; System-6, Thermo Noran Inc., USA).

Figure 10A:
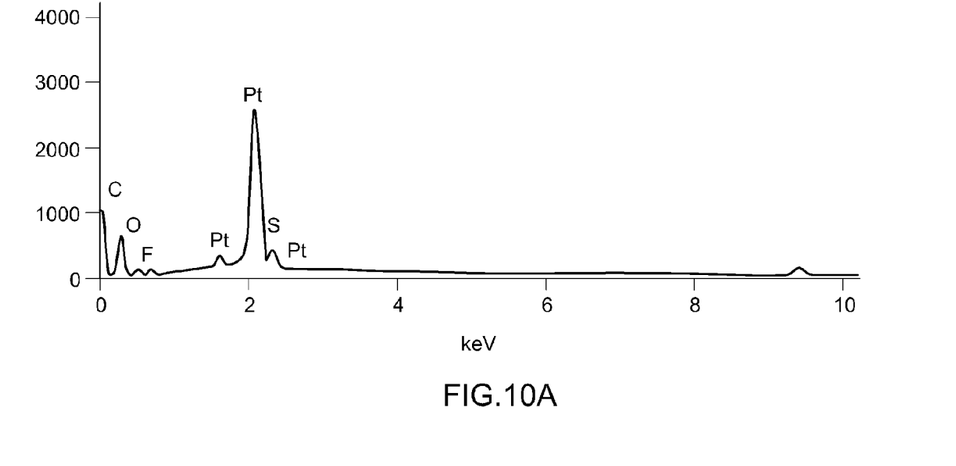
FIGS. 10A and 10B are graphs illustrating analysis results of an energy dispersive X-ray spectrometer (EDX) regarding the surface (region 1 of FIG. 9B) of an MEA anode catalyst layer and impurities attached nearby a pin-hole (region 2 of FIG. 9B) according to an exemplary embodiment of the present invention.
Figure 10B:
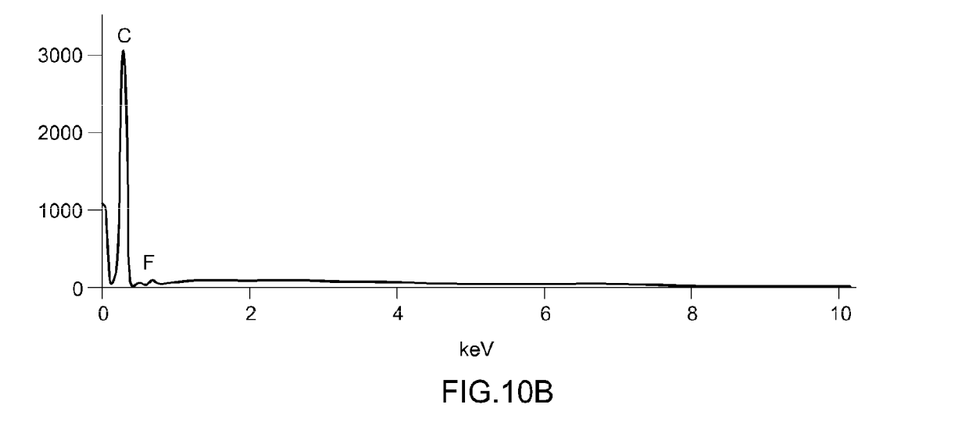

FIGS. 10A and 10B are graphs illustrating analysis results of an EDX regarding the surface (region 1 of FIG. 9B) of an MEA anode catalyst layer and impurities attached nearby a pin-hole (region 2 of FIG. 9B) according to an exemplary embodiment of the present invention. In case of the anode catalyst layer of the MEA, as expected in FIG. 10A, typical elements of the MEA catalyst layer such as platinum (Pt) and fluorine (F) were detected. However, in case of the impurities attached around the pin-hole, excessive carbon and some fluorine were detected as shown in FIG. 10B, which corresponds to typical elements of the micro-porous layer of the gas diffusion layer.

Accordingly, it can be seen that the pin-hole is formed in the MEA due to heat generated at the voltage reversal condition of the exemplary embodiment, and the micro-porous layer of the gas diffusion layer is attached around the pin-hole. At the voltage reversal simulation condition of the embodiment, the morphological damage phenomenon of the MEA and the gas diffusion layer as well as the voltage reversal behavior of some cells due to the local hydrogen starvation generated in an actual fuel cell vehicle can be properly simulated.

According to an exemplary embodiment of the present invention, voltage reversal locally generated in a stack of an actual fuel cell vehicle can be reproducibly and precisely simulated even in an medium current density range of about 200 mA/cm$^2$ to about 1,000 mA/cm$^2$, and occurrence of pin-hole in MEA and breakage of a gas diffusion layer can also be properly simulated.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack comprising:
   a plurality of cells,
   wherein a portion of the plurality of cells includes:
      a structure in which a separator has an inlet of a hydrogen flow field that is partially blocked to induce hydrogen starvation only in the portion of the plurality of cells that include the separator to simulate a cell voltage reversal behavior in the portion of the plurality of cells, wherein a blocking member is attached to a front end of the inlet of the hydrogen flow field formed on one surface of the separator to induce the hydrogen starvation in the separator to which the blocking member is attached, and wherein the hydrogen flow field is disposed between a hydrogen supply inlet and a hydrogen exhaust outlet of a manifold of the fuel cell stack.

2. The stack of claim 1, wherein the blocking member is disposed at the front end of the inlet of the hydrogen flow field on the one surface of the separator to block the hydrogen supply through a hydrogen supply inlet.

3. The stack of claim 2, wherein the blocking member blocks a total area of the inlet of the hydrogen flow field of the separator by about 70% to about 95%.

4. The stack of claim 2, wherein the blocking member is formed of a polymer or a metallic material.

5. The stack of claim 1, wherein the stack operates at a current density of about 200 mA/cm2 to about 1,000 mA/cm2.

6. The stack of claim 1, wherein a number of the cells with the inlet of the hydrogen flow field blocked ranges from one to a half of the total number of the cells in the stack.

7. The stack of claim 1, wherein the blocking member is disposed between a hydrogen supply inlet and the hydrogen flow field.

* * * * *